United States Patent
McCrory et al.

(10) Patent No.: US 9,743,494 B1
(45) Date of Patent: Aug. 22, 2017

(54) JEWELRY DISPLAY CASE

(71) Applicants: Gretel A. McCrory, Warwick, RI (US); Peter M. Larson, North Kingstown, RI (US)

(72) Inventors: Gretel A. McCrory, Warwick, RI (US); Peter M. Larson, North Kingstown, RI (US)

(*) Notice: Subject to any disclaimer, the term of this patent is extended or adjusted under 35 U.S.C. 154(b) by 0 days.

(21) Appl. No.: 15/338,971

(22) Filed: Oct. 31, 2016

(51) Int. Cl.
| | | |
|---|---|---|
| *H05B 37/02* | (2006.01) | |
| *F21V 33/00* | (2006.01) | |
| *H05B 33/08* | (2006.01) | |
| *A45C 11/16* | (2006.01) | |
| *A45C 13/00* | (2006.01) | |
| *A45C 13/02* | (2006.01) | |

(52) U.S. Cl.
CPC .......... *H05B 37/0227* (2013.01); *A45C 11/16* (2013.01); *A45C 13/001* (2013.01); *A45C 13/02* (2013.01); *F21V 33/0004* (2013.01); *H05B 33/0842* (2013.01); *H05B 37/0218* (2013.01); *H05B 37/0236* (2013.01); *H05B 37/0281* (2013.01)

(58) Field of Classification Search
CPC ......... A45C 15/06; A45C 11/16; A45C 13/08; A45C 13/02; A45C 13/001; F21S 9/02; F21V 23/0442; F21V 23/0471; F21V 23/0464; F21V 23/0485; F21V 33/0004; F21Y 2115/15; F21Y 2115/10; H05B 33/0896; H05B 37/02; H05B 37/0227; H05B 33/0842; H05B 37/0218; H05B 37/0281; A47F 7/03; A47F 11/10; A47F 5/0043
See application file for complete search history.

(56) References Cited

U.S. PATENT DOCUMENTS

| | | | |
|---|---|---|---|
| 3,936,156 A | 2/1976 | Shaw et al. | |
| 3,937,320 A | 2/1976 | Chao et al. | |
| 4,917,459 A | 4/1990 | Solitt et al. | |
| 5,329,433 A | 7/1994 | Geeting et al. | |
| 6,844,686 B1 | 1/2005 | Schneck et al. | |
| 7,325,940 B2 * | 2/2008 | Cea .................... | A45C 11/16 206/566 |
| 7,950,819 B2 * | 5/2011 | Wells .................. | A45C 15/06 362/157 |
| 8,730,035 B2 * | 5/2014 | Nagashima ......... | H05B 33/086 340/539.22 |
| 2009/0200183 A1 * | 8/2009 | Dussin ................ | A45C 11/16 206/6.1 |
| 2013/0272041 A1 * | 10/2013 | Cheng ................. | H03K 17/962 363/84 |
| 2014/0111118 A1 * | 4/2014 | Kendall ............. | H05B 37/0218 315/362 |
| 2015/0021497 A1 | 1/2015 | Didur | |

* cited by examiner

*Primary Examiner* — Vibol Tan
(74) *Attorney, Agent, or Firm* — Salter & Michaelson

(57) ABSTRACT

A display case that includes a base for supporting an item that is being displayed; a cover engaged with the base, with the base forming an interior compartment for the item and having respective opened and closed positions relative to the base; a light source disposed in the interior compartment, supported at an internal surface of said cover and, when illuminated, casting a light beam on the item to highlight the item; and a sensor associated with at least one of the base and cover and for activating the light source. The sensor may include a motion detector, a light detector, a touch sensor or a proximity sensor.

17 Claims, 3 Drawing Sheets

JEWELRY DISPLAY CASE

FIELD OF THE INVENTION

The present invention relates in general to a display case, and particularly a jewelry display case. More particularly, the present invention pertains to a novel way of displaying a jewelry item that is disposed in the case or jewelry box by means of illuminating the jewelry item. Even more particularly, the present invention relates to a novel jewelry display case or box in which a sensing arrangement is used to control the illumination.

BACKGROUND OF THE INVENTION

There presently exist jewelry boxes that contain a light source. The light source is typically activated when the jewelry box is opened. Examples are found in U.S. Pat. Nos. 3,937,320; 5,329,433 and 7,325,940. Typically a mechanical switch of some type is used. This may be, for example, a switch at the hinge that closes when the jewelry box is opened to activate the light source. One problem associated with these prior art devices is that the light source may stay on for an indefinite period of time draining the battery that activates the light source.

Accordingly, it is an object of the present invention to provide a novel jewelry product, particularly a jewelry box in which the jewelry item that is contained in the jewelry box is selectively illuminated by means of a sensory signal from a user.

Another object of the present invention is to provide a novel jewelry box or case in which the jewelry item that is contained in the jewelry box is selectively illuminated by using such means as a motion detector, an ambient light sensor, a touch sensor or a proximity sensor.

Still another object of the present invention is to provide a novel jewelry box or case in which the sensory signal is facilitated by simple and inexpensive means that can be readily attached with the jewelry box or case.

SUMMARY OF THE INVENTION

To accomplish the foregoing and other objects and advantages of the present invention there is provided a jewelry display case that includes a base for supporting an item that is being displayed; a cover engaged with the base, with the base forming an interior compartment for the item and having respective opened and closed positions relative to the base; a light source disposed in the interior compartment, supported at an internal surface of said cover and, when illuminated, casts a light beam on the item to highlight the item; and a sensory sensor associated with at least one of the base and cover and for activating the light source.

In accordance with other aspects of the present invention the following features apply:

the sensor comprises a motion detector responsive to a motion of the user for activating the light source;

the motion detector is disposed within the compartment formed by the base and cover, and the motion detector is activated upon mere opening of the cover to, in turn, activate the light source;

the sensor includes an ambient light detector for interrupting energy to the light source in the closed position of the cover;

the sensor includes an ambient light detector that is disposed within the compartment formed by the base and cover, said ambient light detector controlling the light source to interrupt activation of the light source in the closed position of the cover and to activate the light source in the open position of the cover.

the ambient light detector has a variable control to control the level of excitation of the ambient light detector so that the ambient light detector causes illumination of the light source even at low levels of ambient light when the cover is open;

the sensor comprises one of a touch sensor and a proximity sensor;

the touch sensor is disposed within the base and cover;

the sensor comprises a touch sensor disposed external to the base and cover;

the proximity sensor is disposed within the base and cover;

the sensor comprises a proximity sensor disposed external to the base and cover;

the motion detector is coupled in series with the ambient light detector and furthermore in series with the light source;

further including a battery for powering the light source and also disposed in series with the motion detector and the ambient light detector;

the light source comprises an LED;

the item is a piece of jewelry and the base and cover are constructed in the form of a clam shell or rocket box construction;

including a controller for controlling the duration of time that the light source is illuminated; and the controller comprises a mono-stable device that sets a predetermined time interval with the light source controlled to interrupt after the duration of the time interval.

BRIEF DESCRIPTION OF THE DRAWINGS

It should be understood that the drawings are provided for the purpose of illustration only and are not intended to define the limits of the disclosure. In the drawings depicting the present invention, all dimensions are to scale. The foregoing and other objects and advantages of the embodiments described herein will become apparent with reference to the following detailed description when taken in conjunction with the accompanying drawings in which.

DETAILED DESCRIPTION

Figure 1:
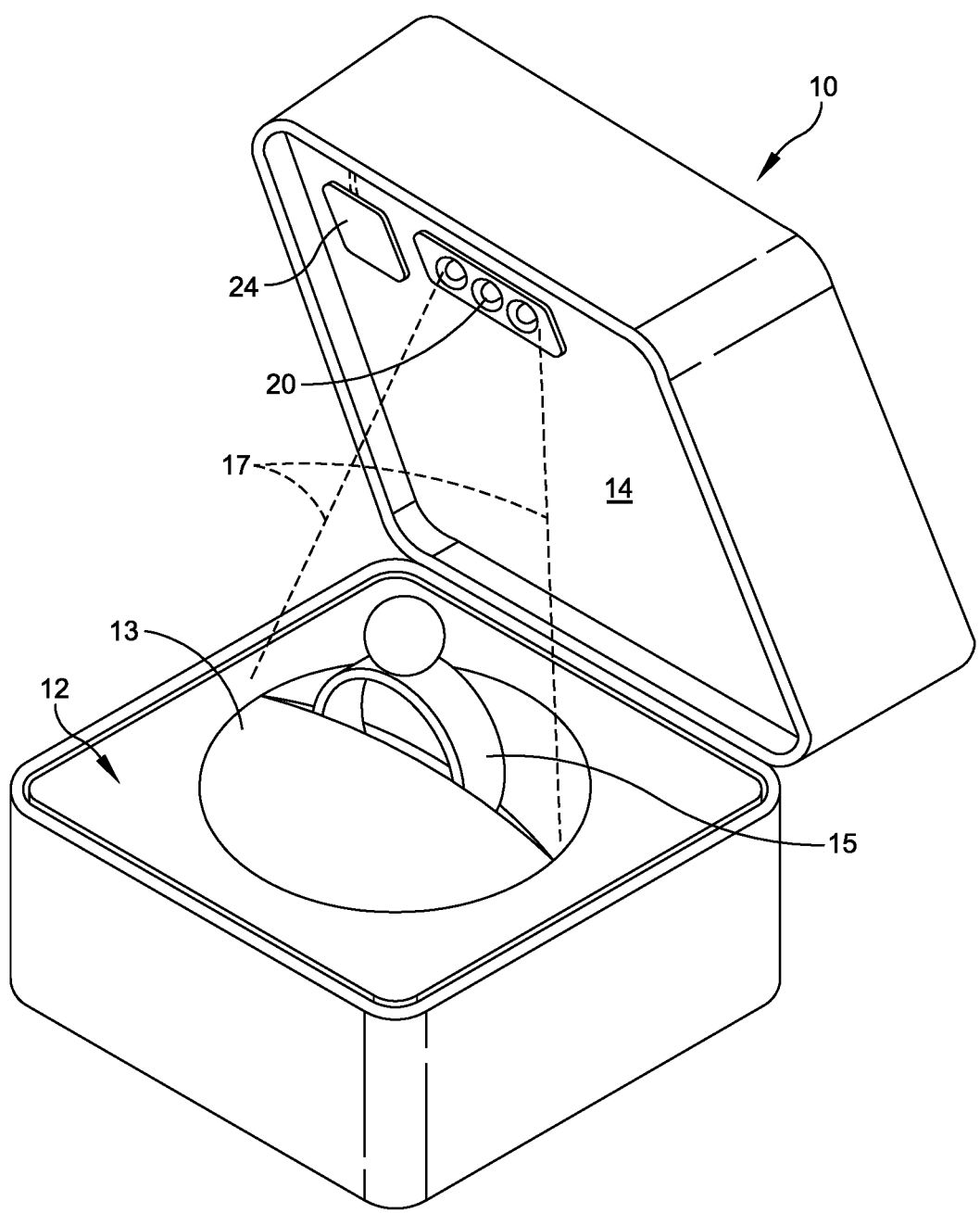
FIG. 1 illustrates a jewelry box or case shown open to illustrate the light source and sensor.
Figure 2:
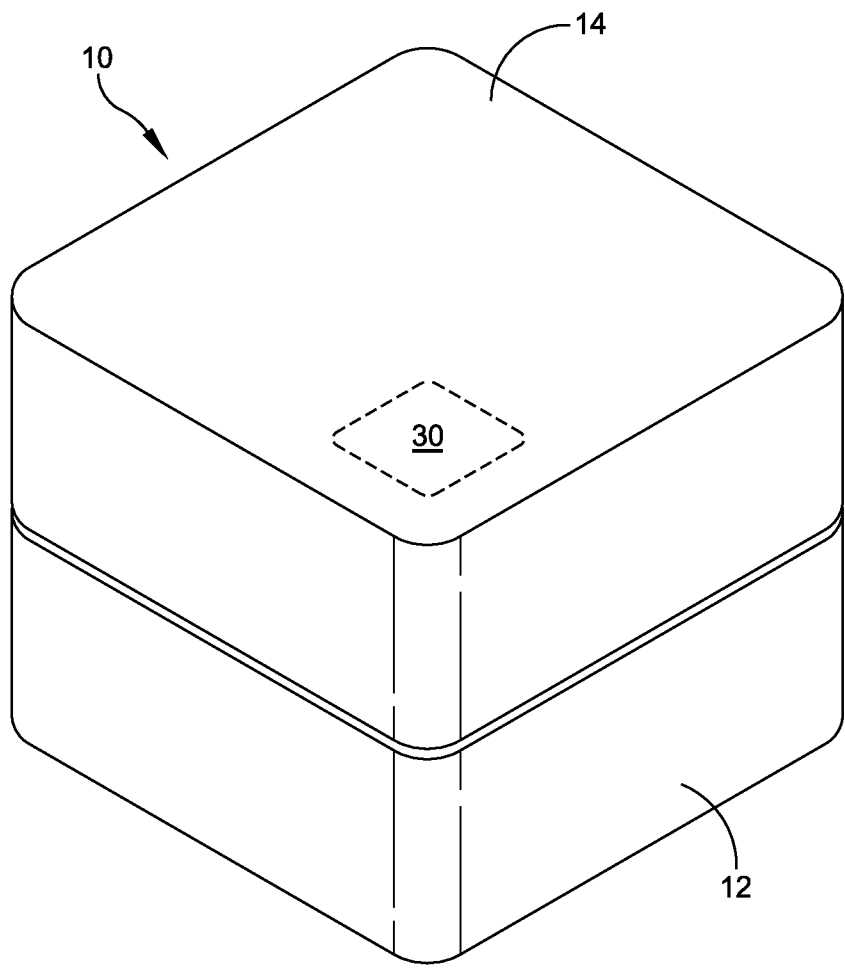
FIG. 2 illustrates the same jewelry box or case of FIG. 1 in a closed position and a motioning action or touch action for illuminating the internal light source.

Reference is now made to FIGS. 1 and 2 that both illustrate a display case 10 that is basically comprised of a base 12 and a cover 14. FIGS. 1 and 2 illustrate one version of the display case. However, the display case can be provided in many different forms including, but not limited to, a clamshell construction or a rocket box construction.

The perspective view of FIG. 1 illustrates the display case in an open position. On the base 12, there may be provided a display area 13 for containing an item such as the illustrated jewelry item 15. FIG. 1 also illustrates on an internal surface of the cover 14 the light source 20 which may be in the form of one or more LED's. Also associated with the cover 14 is the sensor 24. As indicated, the light source is disposed in the interior compartment formed between the cover and base, is supported at an internal surface of the cover, and when illuminated, casts a light beam 17 on the jewelry item 15 so as to highlight the jewelry item.

Reference to FIG. 2 also illustrates the base 12 and the cover 14 in a closed position. There may be associated with either the cover or the base what is referred to herein as a touch zone 30. In the particular embodiment illustrated in FIG. 2 this "touch zone" is disposed at the cover 14. In one embodiment the sensor 24 of FIG. 1 may instead be disposed at the area 30 of FIG. 2. For example, the sensor may be in the form of a touch, proximity or motion detector so that the user simply has to take some motion or touching adjacent to the area 13 in order to control the light source; particularly to activate the light source once the motion or touching occurs.

Figure 3:
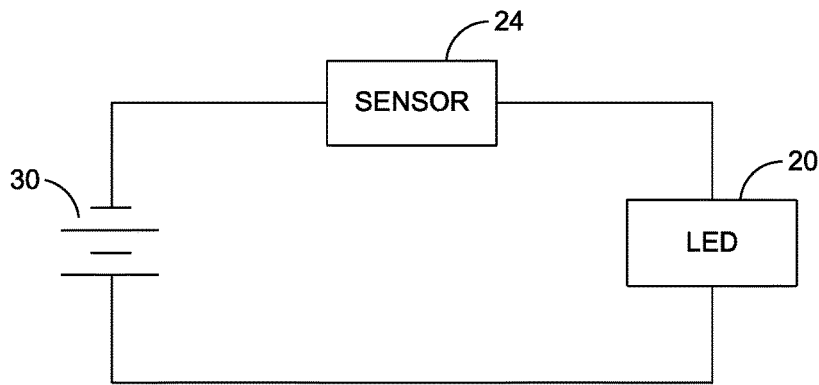
FIG. 3 is a circuit diagram illustrating the light source, battery and sensor of the present invention.
Figure 4:
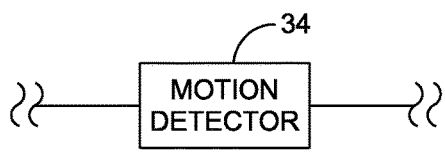
FIG. 4 is a fragmentary view of the circuit of FIG. 3 illustrating the sensor as a motion detector.

Reference may now be made to the circuit diagram of FIG. 3. This depicts the manner in which the sensor 24 and the light source 20 are arranged in a series circuit with the battery 30. The battery 30 may be provided at any location within the display case 10. The battery 30 may be provided in the base 12 along with the wiring that interconnects the battery with the sensor 24 and the light source 20 in the series circuit illustrated in FIG. 3. The sensor 24 is for sensing a sensory condition or, in one embodiment, is in the form of an ambient light detector. A first embodiment of the sensor 24 is illustrated in the fragmentary circuit illustrated in FIG. 4. The sensor is in the form of a motion detector 34 that would also be connected in a series circuit between the battery and the light source. The motion detector 34 may be of conventional design that initiates a control signal for essentially bridging the connection between the battery 30 and the light source 20.

Figure 5:
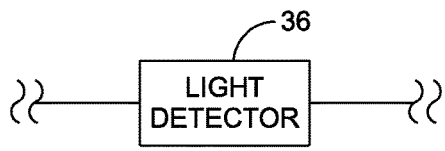
FIG. 5 is a fragmentary view of the circuit of FIG. 3 illustrating an ambient light detector.

FIG. 5 also illustrates an alternate embodiment in which the sensor is in the form of an ambient light detector 36. Refer also to the fragmentary circuit diagram of FIG. 6 that includes both a motion detector 34 and the ambient light detector 36 in a series circuit diagram that also includes a controller 38. The controller 38 may be in the form of a monostable device that allows the light source to be illuminated but only for a set predetermined period of time. This monostable device operates so that it essentially provides a "pulse" of a certain duration. It is only during that pulse duration that the light source is illuminated. After the pulse duration is over, the pulse ends and thus the illumination of the light source ends. This control prevents the light source from staying on for an indefinite period of time.

Figure 6:
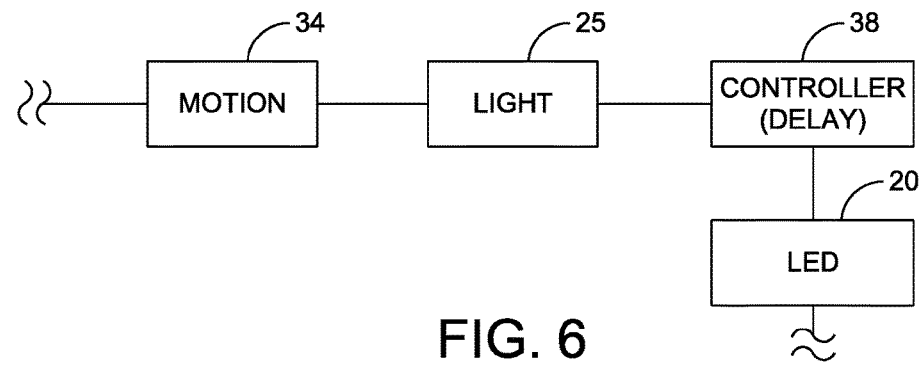
FIG. 6 is a fragmentary view that illustrates a partial series circuit including the battery, motion detector, ambient light detector, an LED light source and a controller for controlling the light source.

In the embodiment of FIG. 6 this is a condition wherein both a motion (34) is sensed as well as ambient light (25). This can occur when the display case is open. As a matter of fact, the mere opening of the display case provides sufficient motion so that both the detector 34, as well as the detector 36, are activated. In that instance the light source 20 can be operated from the battery 30. The controller 38 provides the aforementioned delay period. As indicated previously, this can be in the form of a monostable vibrator type of device that essentially pulses the light source or LED to its illuminated state but only for a predetermined period of time as set by the monostable controller 38.

The use of a controller 38 can also be provided in association with either the motion detector or the light detector. For example, the user may provide some movement, when the display case is open, that is detected and in turn causes the light source to illuminate. There may be situations in which it is not desired to have the light source be continuously illuminated and with the use of the controller 38, one can control the duration of illumination of the light source. This controller 38 may be used separately with either the motion detector 34 or the ambient light detector 36.

Thus, as mentioned previously, the motion detector may be provided either on the outside of the case or inside the case 10. It is preferred that these detectors be placed within the internal case compartment defined between the base 12 and cover 14; particularly the ambient light detector. If both the motion detector and the light detector are within the internal jewelry case compartment, when the user opens the case 10 there may well be enough motion to excite both the motion detector and the light detector. Because the internal compartment is completely dark when the case is closed; once the case is opened virtually any level of light will activate the ambient light detector and the mere opening of the case will most likely also activate the motion detector. Thus, in another embodiment of the invention either detector 34 or 36 may be used without requiring the use of both detectors. For the light detector 36 this device responds to detecting an adjustable amount of light to, in turn, activate the light source 20. The light detector 36 may be of conventional design that initiates a control signal for essentially bridging the connection between the battery 30 and the light source 20.

Figure 7:
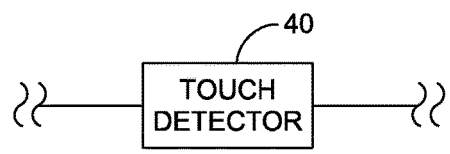
FIG. 7 is a fragmentary view of the circuit of FIG. 3 illustrating the sensor as a touch sensor.
Figure 8:
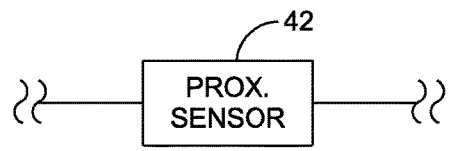
FIG. 8 is a fragmentary view of the circuit of FIG. 3 illustrating the sensor as a proximity sensor.

Reference is also now made to FIGS. 7 and 8. These figures describe further embodiments of the present invention. FIG. 7 illustrates a touch sensor 40 that can be in the circuit of FIG. 3. FIG. 8 illustrates a proximity sensor 42 that can be in the circuit of FIG. 3. The touch sensor 40 may be disposed within the display case inner compartment or at an external surface such as illustrated in FIG. 2. In either case it is preferred to also use the controller of FIG. 6 so that the illumination of the jewelry item is limited to a set predetermined of time. In a sense the proximity sensor of FIG. 8 may be considered as substantially the same as the motion detector 34 of FIG. 4. The proximity sensor 42 may also be disposed within the display case inner compartment or at an external surface such as illustrated in FIG. 2. In either case it is preferred to also use the controller of FIG. 6 so that the illumination of the jewelry item is limited to a set predetermined of time.

As previously mentioned, FIG. 7 shows a fragmentary view of the circuit of FIG. 3 illustrating the sensor as a touch sensor FIG. 8 illustrates a fragmentary view of the circuit of FIG. 3 illustrating the sensor as a proximity sensor. In still another embodiment of the present invention, either of these sensors illustrated in FIGS. 7 and 8 can also be replaced by a sound sensor or transducer. In that way, the highlighting of the item can be based upon the detection of a sound.

Having now described a limited number of embodiments of the present invention, it should now be apparent to those skilled in the art that numerous other embodiments and modifications thereof are contemplated as falling within the scope of the present invention, as defined by the appended claims. For example, the concepts of the present invention can be applied to virtually any type of display case that displays any item whether a jewelry item or not.

What is claimed is:

1. A display case comprising:
a base for supporting an item that is being displayed;
a cover engaged with the base, with the base forming an interior compartment for the item and having respective opened and closed positions relative to the base;
a light source disposed in the interior compartment, supported at an internal surface of said cover and, when illuminated, casting a light beam on the item to highlight the item;
and a sensor associated with at least one of the base and cover and for activating the light source;
wherein the sensor comprises a motion detector responsive to a motion of the user for activating the light source;
wherein the motion detector is disposed within the compartment formed by the base and cover, and the motion detector is activated upon mere opening of the cover to, in turn, activate the light source;
further including an ambient light detector associated with the motion detector and for interrupting energy to the light source in the closed position of the cover.

2. The display case of claim 1 wherein the sensor includes an ambient light detector for interrupting energy to the light source in the closed position of the cover.

3. The display case of claim 1 wherein the sensor includes an ambient light detector that is disposed within the compartment formed by the base and cover, said ambient light detector controlling the light source to interrupt activation of the light source in the closed position of the cover and to activate the light source in the open position of the cover.

4. A display case comprising:
a base for supporting an item that is being displayed;
a cover engaged with the base, with the base forming an interior compartment for the item and having respective opened and closed positions relative to the base;
a light source disposed in the interior compartment, supported at an internal surface of said cover and, when illuminated, casting a light beam on the item to highlight the item;
and a sensor associated with at least one of the base and cover and for activating the light source;
wherein the sensor includes an ambient light detector that is disposed within the compartment formed by the base and cover, said ambient light detector controlling the light source to interrupt activation of the light source in the closed position of the cover and to activate the light source in the open position of the cover;
wherein the ambient light detector has a variable control to control the level of excitation of the ambient light detector so that the ambient light detector causes illumination of the light source even at low levels of ambient light when the cover is open.

5. The display case of claim 4 wherein the sensor further comprises one of a touch sensor, proximity sensor and sound sensor.

6. The display case of claim 5 wherein the sensor comprises a touch sensor.

7. The display case of claim 6 wherein the touch sensor is disposed within the base and cover.

8. The display case of claim 6 wherein the sensor comprises a touch sensor disposed external to the base and cover.

9. The display case of claim 4 wherein the sensor comprises a proximity sensor or a sound sensor.

10. The display case of claim 9 wherein the proximity sensor or the sound sensor is disposed within the base and cover.

11. The display case of claim 9 wherein the sensor comprises a proximity sensor or a sound sensor disposed external to the base and cover.

12. A display case comprising:
a base for supporting an item that is being displayed;
a cover engaged with the base, with the base forming an interior compartment for the item and having respective opened and closed positions relative to the base;
a light source disposed in the interior compartment, supported at an internal surface of said cover and, when illuminated, casting a light beam on the item to highlight the item;
and a sensor associated with at least one of the base and cover and for activating the light source;
wherein the sensor comprises a motion detector responsive to a motion of the user for activating the light source;
wherein the motion detector is disposed within the compartment formed by the base and cover, and the motion detector is activated upon mere opening of the cover to, in turn, activate the light source;
wherein the motion detector is coupled in series with an ambient light detector and furthermore in series with the light source.

13. The display case of claim 12 further including a battery for powering the light source and also disposed in series with the motion detector and the ambient light detector.

14. The display case of claim 12 wherein the light source comprises an LED.

15. The display case of claim 12 wherein the item is a piece of jewelry and the base and cover are constructed in the form of a clam shell or rocket box construction.

16. The display case of claim 12 including a controller for controlling the duration of time that the light source is illuminated.

17. The display case of claim 16 wherein the controller comprises a mono-stable device that sets a predetermined time interval with the light source controlled to interrupt after the duration of the time interval.

* * * * *